March 30, 1954 — R. F. ANDERSON — 2,673,675
MULTIFLAVOR ICE CREAM NOZZLE
Filed Jan. 2, 1952 — 4 Sheets-Sheet 4
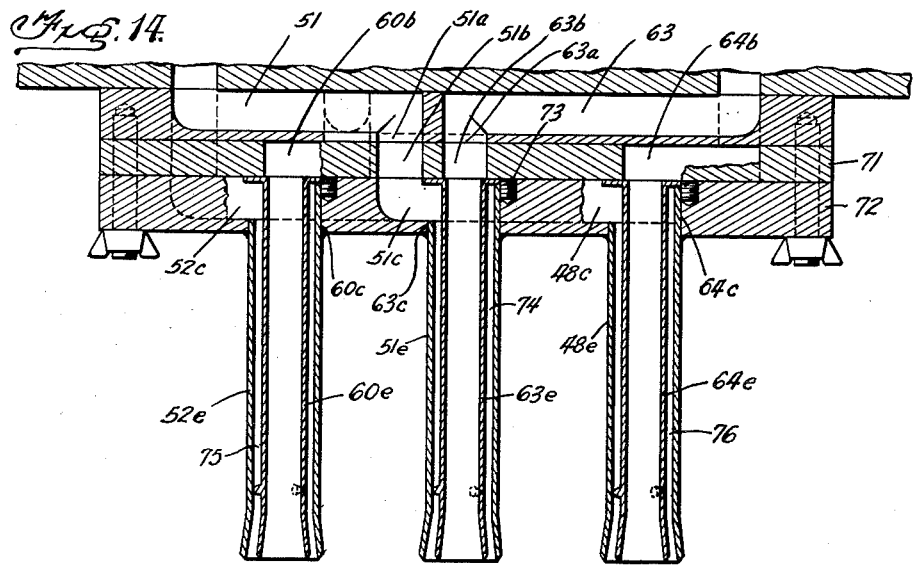
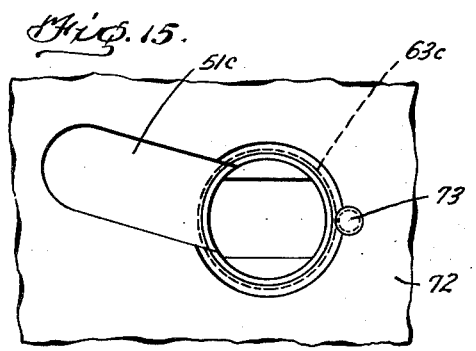
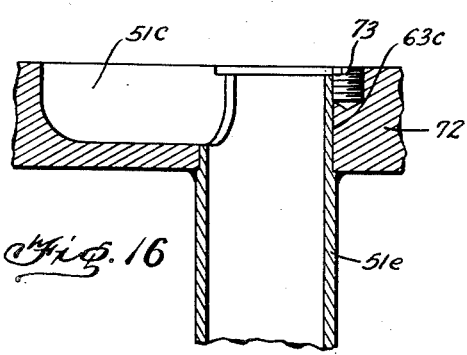
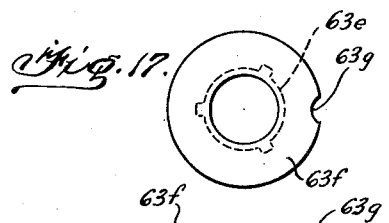
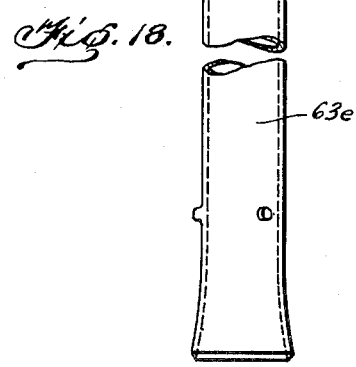
Inventor
Ralph F. Anderson
By McCanna and Morsbach
Attorneys Patented Mar. 30, 1954

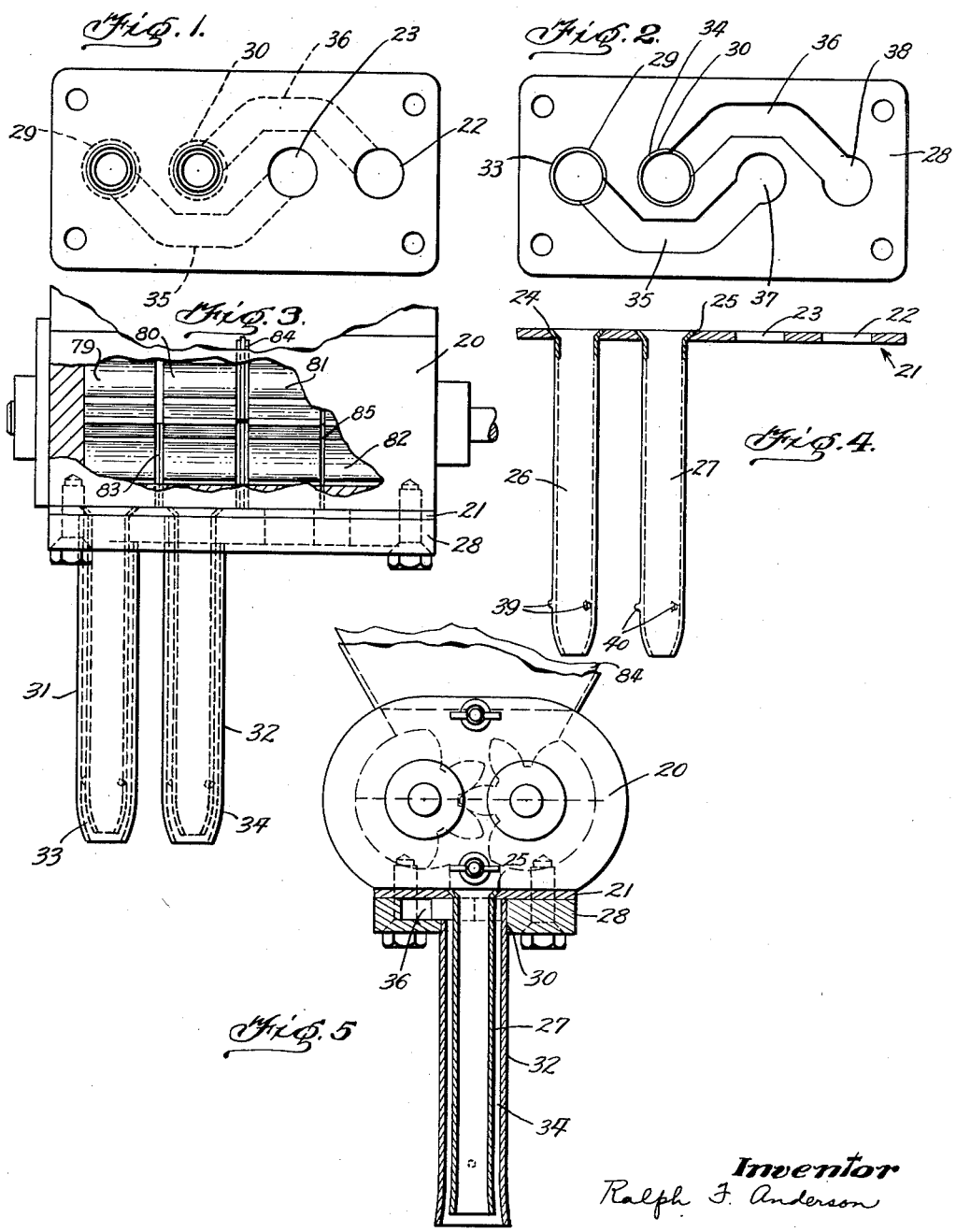

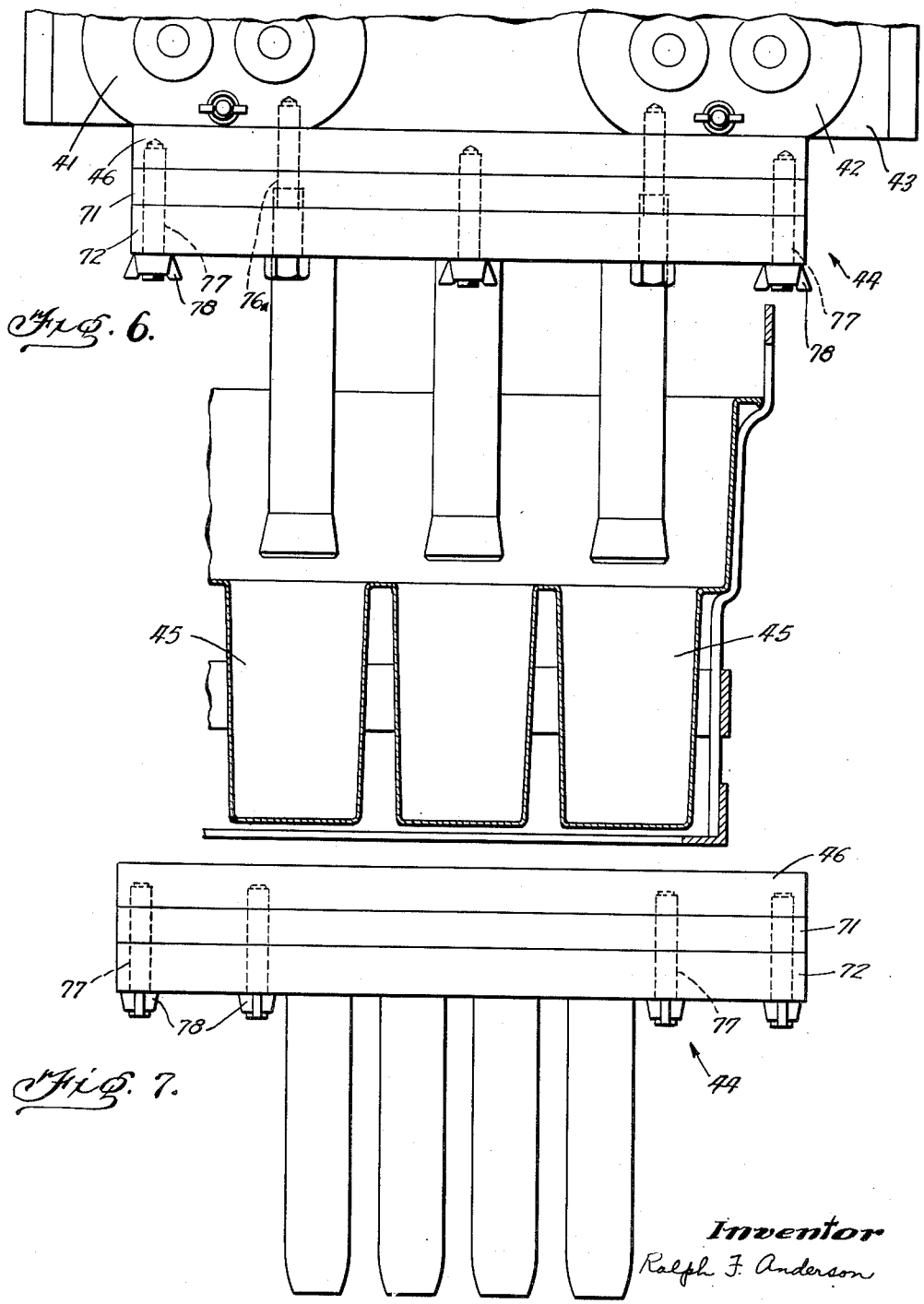

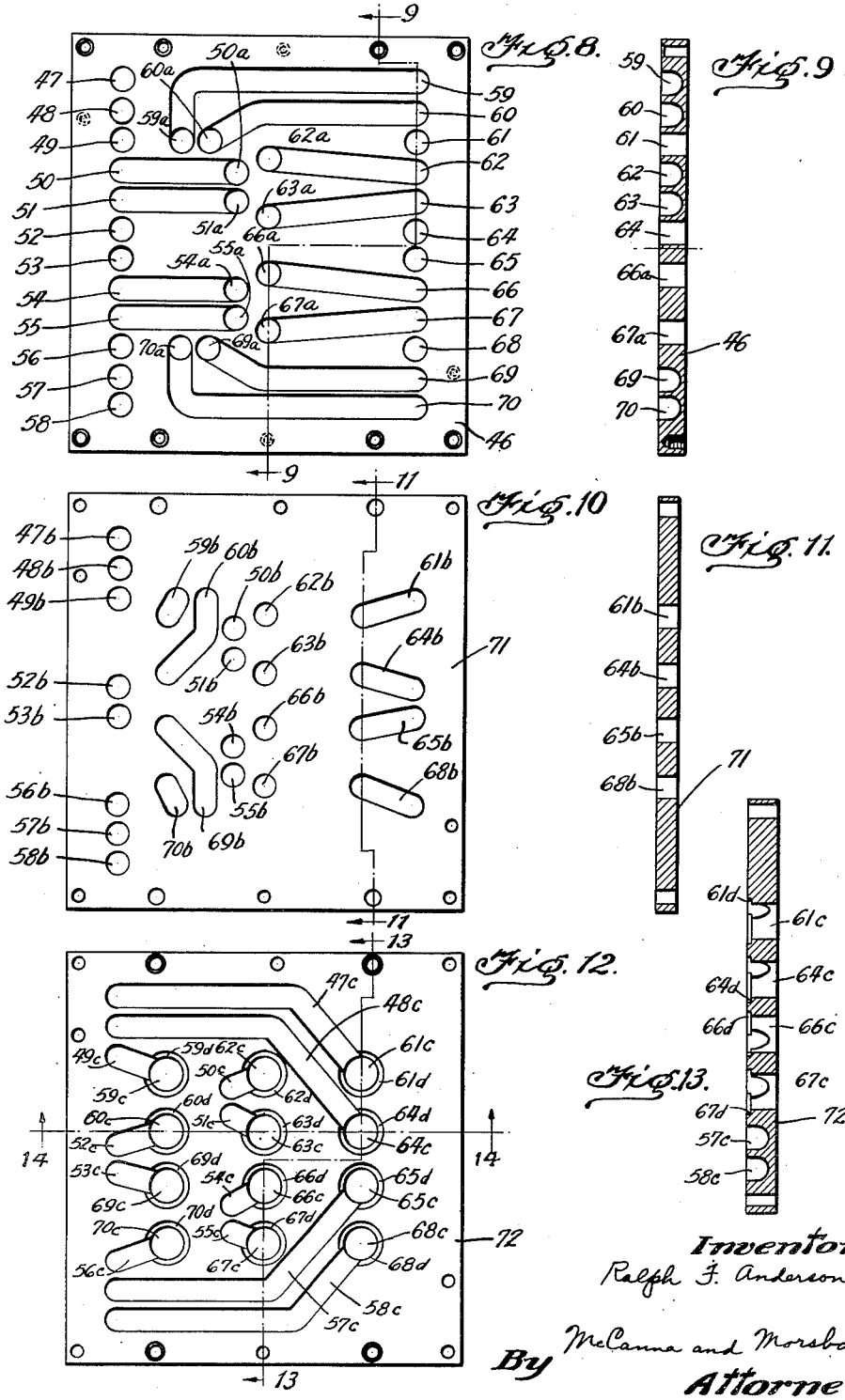

2,673,675

UNITED STATES PATENT OFFICE 2,673,675

MULTIFLAVOR ICE CREAM NOZZLE

Ralph F. Anderson, Rockford, Ill.

Application January 2, 1952, Serial No. 264,552

10 Claims. (Cl. 226—100)

This invention relates to a multi-flavor filler nozzle assembly for plastic comestibles, such as ice cream.

It is an object of this invention to provide a novel arrangement for discharging multiple flavors of comestible material into a receptacle.

Another object of this invention is to provide novel arrangements for discharging multiple flavors of comestible material into each of a plurality of receptacles.

A further object of this invention is to provide novel arrangements for discharging differently flavored comestible material from two separate sources into each of a plurality of receptacles.

It is also an object of this invention to provide a multi-flavor filler nozzle which is of separable construction facilitating its cleaning.

A specific object of this invention resides in the provision of a multi-flavor filler nozzle of unitary novel construction enabling the filling of a large number of receptacles simultaneously from each of two separate sources of plastic comestible material, such as ice cream.

Other and further objects and advantages of the invention will be apparent from the following description of preferred embodiments thereof, which are shown in the accompanying drawings to illustrate the principles and practical application of the invention.

In the drawings:

Figure 1 is a top view of one form of the present invention;

Figure 2 is a top view of the lower plate and inner tube sub-assembly which forms a part of the overall filler nozzle assembly of Fig. 1;

Figure 3 is a front view of the Fig. 1 assembly mounted on an ice cream supply source;

Figure 4 is a front view of the Fig. 2 sub-assembly;

Figure 5 is an end view, partly in section of the Fig. 2 assembly;

Figure 6 is a front view of another embodiment of the invention mounted in place on an ice cream supply source and showing the receptacles to be filled in position;

Figure 7 is an end view of the Fig. 6 form of the invention detached from the ice cream supply source;

Figure 8 is a top view of a top plate forming part of the embodiment of the invention which is shown in Fig. 7;

Figure 9 is a section along the line 9—9 in Fig. 8;

Figure 10 is a top view of a middle plate forming part of the Fig. 7 assembly;

Figure 11 is a section along the line 11—11 in Fig. 10;

Figure 12 is a top view of a bottom plate which is part of the assembly of Fig. 7;

Figure 13 is a section along the line 13—13 in Fig. 12;

Figure 14 is a longitudinal section through the Fig. 7 assembly;

Figure 15 is a fragmentary top view showing the mounting for one of the nozzles in the Fig. 7 assembly;

Figure 16 is a fragmentary section showing details of the mounting of the outer tube in the nozzle of Fig. 15;

Figure 17 is a top view of the inner tube in the Fig. 15 nozzle; and

Figure 18 is a front view, partly broken away, showing the inner tube in the Fig. 15 nozzle.

In the following description, the practical utility of the invention will be related to the feeding of ice cream in a plastic state to receptacles to be filled. It is to be understood, however, that the invention is not limited to use with this particular comestible but may also be used with other similar materials.

Referring to Figs. 1–5, this form of the invention is shown attached to a pump housing 20 in which are located four gear pumps 79–82. The housing 20 is divided by the vertical partition 84 into two separate chambers which communicate respectively with separate sources of differently flavored ice cream for discharging the same to the filler nozzle. The partition 83 separates one gear set 79 from the adjacent gear set 80 at one side of partition 84, while the partition 85 separates gear set 81 from gear set 82 at the opposite side of partition 84.

The filler nozzle assembly includes an upper plate 21 (Fig. 4) whose upper face abuts against the lower face of pump housing 20 (Fig. 3). At one end the upper plate 21 is formed with a pair of holes or passages 22 and 23. Passage 22 receives the ice cream discharged from gear pump 82, while passage 23 receives the ice cream discharged from gear pump 81. At its other end the upper plate 21 is formed with a pair of frusto-conical holes or passages 24 and 25 in which the frusto-conical, open upper ends of the inner tubes 26 and 27 are separably seated. These tubes 26 and 27 define passages which at their upper ends communicate respectively with the pumps 79 and 80 at this end of the housing to receive the ice cream therefrom and to discharge the same downwardly through their open lower ends to the receptacles to be filled.

Directly beneath the upper plate 21 there is positioned the lower plate 28 which has its upper face abutting against the lower face of the upper plate. A pair of vertical holes or passages 29 and 30 extend directly through the lower plate directly beneath the holes 24 and 25 in upper plate 21. A pair of depending outer tubes 31 and 32 are suitably attached to the lower plate at these holes, as by welding and soldering. These holes 29 and 30 in the lower plate and the outer tubes 31 and 32 are dimensioned to freely receive the inner tubes 26 and 27, so that annular passages 33 and 34 are formed respectively between the inner and outer tubes 26 and 31 and the inner and outer tubes 27 and 32. These downwardly extending annular passages communicate at their upper ends, at the holes 29 and 30, with channel shaped passages 35 and 36 formed in the upper face of the lower plate 28. At their opposite ends these passages terminate at circular recesses 37 and 38 in the upper face of lower plate 28 which register respectively with the holes or passages 23 and 22 formed in the upper plate 21. Thus, ice cream discharged through the respective passages 22 and 23 in upper plate 21 passes through the passages 36 and 35 in the upper plate down through the annular passages 34 and 33 formed between the respective inner and outer tubes.

The entire assembly of upper plate 21, inner tubes 26 and 27, lower plate 28, and outer tubes 31 and 32 is releasably attached, as by threaded bolts, to the underside of pump housing 20. The protrusions 39 on inner tube 26 and 40 on inner tube 27 are for the purpose of centering the inner tubes within their respective outer tubes.

In the operation of this form of the invention, ice cream of one flavor is discharged by the pumps 79 and 80 directly into the inner tubes 26 and 27 and passes downwardly therethrough to the receptacle to be filled. The other flavor of ice cream is discharged by the other pumps 81 and 82 through the holes 23 and 22 in upper plate 21, and thence through passages 35 and 36 in lower plate 28 to the annular passages 33 and 34 formed between the inner and outer tube assemblies.

Because of the intended use of this filler nozzle assembly, which is the feeding of comestible products, such as ice cream, it is imperative that it be maintained sanitary. To this end, the assembly of Figs. 1–5 may be disassembled readily by first unbolting it from the pump housing 20. Then the lower plate 28 and the outer tubes 31 and 32, which are secured thereto, are separated from the sub-assembly of the upper plate 21 and the inner tubes 26 and 27. Finally, the inner tubes 26 and 27 may, if desired, be lifted out of the upper plate. The vertical passages 22–25 in the upper plate 21 may then be readily cleaned by a brush, while the passages in the inner tubes 26 and 27 and the outer tubes 31 and 32 may also be cleaned by brushes inserted at their respective open upper ends. The passages 35 and 36 in the upper face of the lower plate 28 are also readily accessible for cleaning by running a brush or similar cleaning article therealong.

In the form of the invention shown in Figs. 6–18, there is provided a pair of assemblies 41 and 42 of twelve gear pumps each at opposite ends of the pump housing 43. These pump assemblies communicate respectively with two separate sources of differently flavored ice cream. Attached to the underside of the pump housing is a filler nozzle assembly, indicated generally at 44, having twelve separate depending nozzles for filling a corresponding number of receptacles 45.

This filler nozzle assembly includes a top plate 46 (Fig. 8) which has a plurality of spaced vertical passages or holes 47, 48, 49, 52, 53, 56, 57 and 58 adjacent one end positioned to communicate with the first pump assembly 41 to receive the ice cream discharged therefrom. Top plate 46 is also formed with channel shaped passages 50, 51, 54 and 55 extending along its upper face from adjacent the first pump set inwardly to the vertical passages or holes 50a, 51a, 54a and 55a, which extend through the top plate. These passages 50, 51, 54 and 55 pass ice cream from the first pump assembly to the passages 50a, 51a, 54a and 55a. Adjacent its opposite end the top plate 46 is formed with a plurality of spaced vertical passages or holes 61, 64, 65 and 68 which communicate with the second pump assembly 42 to pass the ice cream discharged therefrom. Top plate 46 is also formed at its upper face with channel shaped passages 59, 60, 62, 63, 66, 67, 69 and 70, which extend from beneath the second pump assembly to the vertical passages or holes 59a, 60a, 62a, 63a, 66a, 67a, 69a and 70a. The passages 59, 60, 62, 63, 66, 67, 69 and 70 pass ice cream from the second pump assembly to the passages 59a, 60a, 62a, 63a, 66a, 67a, 69a and 70a.

Directly beneath the top plate 46 is a middle or intermediate plate 71 having its upper face abutting against the lower face of the top plate 46. Plate 71 is formed with a plurality of vertical passages or holes 47b, 48b, 49b, 52b, 53b, 56b, 57b and 58b which register respectively with the correspondingly numbered passages 47, 48, 49, 52, 53, 56, 57 and 58 in the top plate. Plate 71 is also formed with vertical passages or holes 50b, 51b, 54b and 55b which register respectively with the holes 50a, 51a, 54a and 55a in top plate 46. Also formed in plate 71 are a plurality of vertical passages or holes 62b, 63b, 66b and 67b which register respectively with the holes 62, 63, 66 and 67 in top plate 46. Also formed to extend through the middle plate are the elongated passages 59b, 60b, 61b, 64b, 65b, 68b, 69b and 70b which register respectively with the holes 59a, 60a, 61, 64, 65, 68, 69a and 70a in top plate 46.

The bottom plate 72 of the filler nozzle assembly is formed with twelve vertical passages or holes 59c–70c, which are substantially surrounded at their upper ends by counterbores 59d–70d. The holes 59c–70c register respectively with the passages 59b–70b in the middle plate. At its upper face the bottom plate 72 is formed with elongated passages 47c, 48c, 57c and 58c which respectively effect communication between the passages 47b, 48b, 57b and 58b in the middle plate 71 and the passages 61c, 64c, 65c and 68c in the bottom plate. Also at its upper face the bottom plate 72 is formed with relatively short passages 49c, 50c, 51c, 52c, 53c, 54c, 55c and 56c which respectively effect communication between the passages 49b, 50b, 51b, 52b, 53b, 54b, 55b and 56b in the middle plate 71 and the passages 59c, 62c, 63c, 60c, 69c, 66c, 67c and 70c in the bottom plate 72.

Figure 14 illustrates the mounting at the passages 60c, 63c and 64c of the inner and outer tubes through which ice cream is discharged to the receptacles disposed therebeneath. The other nine inner and outer tubes in the nozzle assembly are mounted in similar fashion.

The inner tube 63e (Fig. 18) has its transverse flange 63f at its upper end seated in the counterbore 63d at the upper end of the passage 63c in the bottom plate 72. As best seen in Fig. 17, the upper flange 63f on the inner tube 63e is formed with an arcuate recess 63g which snugly receives a screw 73 threadedly received in the upper face of the bottom plate 72. In this manner the inner tube flange 63f is properly located angularly in the counterbore 63d in which it is seated.

The outer tube 51e is fixedly secured to lower plate 72, as by welding and soldering, at the passage 63c and extends downwardly therefrom. As best seen in Fig. 14, the inner tube 63e is of substantially smaller diameter than the outer tube 51e in which it is positioned, so that an annular passage 74 is formed between them. This annular passage 74 communicates with the passage 51c formed in the upper face of bottom plate 72, while the passage defined by inner tube 63e communicates with the passage 63b in the middle plate 71.

In like manner, the inner tube 60e is mounted to have its axial passage communicate with the passage 60b in the middle plate 71, while the annular passage 75 between inner and outer plates 60e and 52e communicates with the passage 52c formed in the upper face of the bottom plate 72.

Likewise, the inner tube 64e is positioned with its passage in communication with the passage 64b in the middle plate 71, and the annular passage 76 between outer tube 48e and inner tube 64e communicates with the passage 48c formed in the upper face of the bottom plate 72.

The top, middle and bottom plates 46, 71 and 72 are releasably interconnected by threaded bolts 77, which carry wing nuts 78 at their outer ends. The entire assembly is releasably attached to the pump housing 43 by threaded bolts 76a.

As illustrative of the operation of this assembly, the flow paths for ice cream to the filler nozzle assembly of tubes 51e and 63e are as follows: Ice cream of one flavor is discharged to the passage 51 in the upper face of the top plate 46 and thence through hole 51a in the top plate, through passage 51b in the middle plate 71, and thence through passage 51c at the upper face of the bottom plate 72 to the annular passage 74 between outer tube 51e and inner tube 63e. Also, ice cream of a different flavor is discharged to the passage 63 in the upper face of the top plate 46 and thence through the hole 63a in the top plate through passage 63b in the middle plate 71 to the axial passage extending through the inner tube 63e. Thus, two different flavors of ice cream may be discharged at the nozzle formed by outer and inner tubes 51e and 63e. The same is true for each of the other combinations of an outer and an inner tube.

For cleaning the filler nozzle assembly of Figs. 6-18, the assembly is first unbolted from the underside of the pump housing 43. Then the subassembly of bottom plate 72 and the inner and outer tubes is separated from the remainder of the nozzle assembly, after which the loosely positioned inner tubes are separate from the integral combination of the lower plate 72 and the outer tubes. Finally, the top and middle plates 46 and 71 are separated from one another. This leaves the vertical passages which extend through the top plate 46 and the elongated channel shaped passages formed in the upper face of the top plate accessible for cleaning. Likewise the several vertical passages through the middle plate 71 are accessible for cleaning, and the vertical passages in the bottom plate 72 and the channel shaped passages in the upper face thereof are accessible for cleaning. The inner and outer tubes may be cleaned by brushes inserted through their open upper ends.

While in the foregoing description there are shown preferred embodiments of the present invention, it is to be understood that various changes, modifications, omissions, and refinements which depart from the described forms of the invention may be adopted without departing from the spirit and scope of my invention.

I claim:

1. A multi-flavor filling nozzle comprising a first plate, an inner tube depending therefrom and defining a downwardly extending passage opening at its upper end through said first plate to receive material discharged therethrough, said first plate being formed with a downwardly extending passage in spaced relation from said inner tube, a second plate located beneath said first plate and separable therefrom, said second plate being formed with an elongated channel at its flat upper face communicating with said downwardly extending passage in the first plate and extending away therefrom and terminating in a hole through which said inner tube extends loosely, and an outer tube attached to said second plate and communicating with said hole to receive the material discharged at said downwardly extending passage in the first plate through said channel in the upper face of the second plate.

2. A multi-flavor filling nozzle comprising a first plate formed with a first hole, an inner tube depending from said first plate and defining a downwardly extending passage which opens at its upper end at said first hole in the first plate for receiving the material discharged thereat, a lower plate separably disposed beneath said first plate and formed with a hole through which said inner tube extends in spaced relation from the walls defining the hole, an outer tube attached to said lower plate and surrounding said inner tube in spaced relation therefrom to define therewith an annular passage communicating with said hole in the lower plate, said first plate being formed with a second hole in spaced relation from said inner tube, and said lower plate being formed at its flat upper face with an elongated channel communicating between said hole in the lower plate and said second hole in the first plate to pass the material discharged at said second hole in the first plate to said annular passage between the inner and outer tubes.

3. A multi-flavor filling nozzle comprising a lower plate formed with a hole, an outer tube integrally secured to the lower plate at said hole therein and depending therefrom, said lower plate being formed at its flat upper face with an elongated channel communicating with said hole and extending away therefrom, a second plate disposed immediately above said lower plate, said second plate being formed with a first hole registering with said hole in the lower plate, an inner tube releasably mounted at said second plate at said first hole therein and extending downwardly therefrom through said hole in the lower plate and said outer tube, said inner tube being open at its upper end to receive material discharged thereat, said inner tube being dimensioned to pass loosely through said hole in the lower plate and said outer tube to form therewith an annular passage between the outer and inner tubes which communicates at its upper end with said channel in the upper face of the lower plate, said second plate being formed with a second hole in spaced relation from said inner tube and communicating with said channel in the upper face of the lower plate to pass to said annular passage between the outer and inner tubes the material discharged at said second hole in the second plate, and means for releasably attaching said lower plate and said second plate together.

4. A multi-flavor filling nozzle comprising a first plate formed with a first hole, an inner tube extending downwardly from said first plate and defining a tubular passage which opens at its upper end at said first hole in the first plate for receiving the material discharged thereat, a lower plate separably disposed beneath said first plate and formed with a hole through which said inner tube extends, an outer tube attached to said lower plate at said hole therein and extending downwardly therefrom, said outer tube loosely surrounding said inner tube and defining therewith a downwardly extending passage communicating with said hole in the lower plate, said first plate being formed with a second hole in spaced relation from said inner tube, and said lower plate being formed at its flat upper face with an elongated channel extending between said hole in the lower plate and said second hole in the first plate to pass the material discharged at said second hole in the first plate to said downwardly extending passage between the outer and inner tubes.

5. A multi-flavor filling nozzle comprising a lower plate formed adjacent one end with a pair of holes including an outer hole located adjacent said end of the lower plate and an inner hole spaced inwardly from said outer hole in a direction from said end of the lower plate, a pair of outer tubes integrally secured to the lower plate at said holes therein and extending downwardly therefrom, said lower plate being formed at its flat upper face with a pair of separate elongated channels which communicate respectively with said outer tubes and which extend away therefrom and terminate adjacent the other end of the lower plate alignment with said pair of holes in the lower plate, an upper plate disposed immediately above said lower plate, said upper plate being formed adjacent one end with a first pair of holes which register respectively with said holes in the lower plate, a pair of inner tubes releasably mounted on said upper plate at said first pair of holes therein and extending downwardly therefrom respectively through the corresponding holes in the lower plate and the corresponding outer tubes, said inner tubes being open at their upper ends to receive the material discharged thereat and being dimensioned to pass loosely through the corresponding holes in the lower plate and the corresponding outer tubes to form therewith annular passages which extend downwardly between the interfitting outer and inner tubes and which communicate at their upper ends with the respective channels in the upper face of the lower plate, said upper plate being formed adjacent its other end with a second pair of holes which communicate respectively with the channels in the upper face of the lower plate to pass to said annular, downwardly extending passages between the outer and inner tubes the material discharged at said second pair of holes in the upper plate, and means for releasably attaching said upper and lower plates together.

6. A multi-flavor filling nozzle for filling a plurality of receptacles from two sources of differently flavored ice cream, comprising a top plate formed with a plurality of passages which are open at their upper ends adjacent respective opposite ends of the top plate for receiving ice cream discharged thereat and which pass downwardly through the top plate, a middle plate separably mounted directly beneath the top plate and formed with a first set of passages extending through the middle plate and communicating with those passages in the top plate which extend from adjacent one end thereof, a plurality of downwardly extending inner tubes separably positioned to extend beneath said middle plate and positioned inwardly from said opposite ends of the plate assembly, said inner tubes communicating with respective ones of the passages of said first set of passages in the middle plate to receive the ice cream discharged at said passages in the top plate at said one end thereof, said middle plate being formed with other passages which extend through the middle plate and which communicate with the other passages in the top plate extending from adjacent the opposite end thereof, a bottom plate separably positioned directly beneath said middle plate and formed with a plurality of passages communicating with said other passages in the middle plate to receive the ice cream discharged at said opposite end of the top plate, and outer tubes secured to said bottom plate and extending downwardly therefrom in communication with said passages in the bottom plate, each of said outer tubes surrounding an inner tube and loosely receiving the same to define therewith a downwardly extending passage communicating with the respective passage in the bottom plate.

7. A multi-flavor nozzle comprising telescopically interfitting inner and outer downwardly extending tubes which define a space between them, and separable plates disposed above said tubes formed with passages communicating respectively with the passage enclosed by the inner tube and with the passage at the space between the inner and outer tubes and terminating respectively adjacent opposite ends of the plate assembly at the upper side thereof.

8. A multi-flavor nozzle comprising a plurality of separable plates formed with a plurality of passages which extend from two rows of openings located respectively adjacent opposite ends of the plate assembly at the upper side thereof to locations positioned inwardly from the ends of the plate assembly, and a plurality of rows, greater than two, of sets of telescopically interfitting inner and outer tubes which define spaces between the tubes of each set, said rows of tube sets being located inwardly from said rows of openings, said inner tubes communicating with the passages in the plates leading from the row of openings adjacent one end of the plate assembly and the space between the inner and outer tubes communicating with the respective passages in the plates leading from the row of openings adjacent the opposite end of the plate assembly.

9. A multi-flavor filling nozzle for filling a plurality of rows, greater than two, of receptacles from two sources of differently flavored plastic comestible, comprising a top plate formed with a first plurality of passages presenting openings which extend in a row at the upper face of the top plate adjacent one end of the top plate, certain of said passages extending straight through the top plate and the others of said passages being in the form of channels extending along the upper face of the top plate and terminating in a series of holes through the top plate located inwardly from said one end of the top plate, said top plate being formed with a second plurality of passages presenting openings which extend in a row at the upper face of the top plate adjacent the opposite end of the top plate, certain of said second plurality of passages extending straight through the top plate and the others of said second plurality of passages being in the form of channels extending along the upper face of the top plate and terminating in a series of holes through the top plate located inwardly from said opposite end of the top plate, a bottom plate separably positioned below said top plate and formed with a plurality of channels extending along the upper face of the top plate and communicating with said second plurality of passages in the top plate, said channels in the bottom plate terminating in a plurality of rows, greater than two, of holes extending through the bottom plate, a plurality of downwardly extending inner tubes separably positioned to extend below said bottom plate and arranged in a plurality of rows, greater than two, located inwardly from the ends of the plate assembly, said inner tubes at their upper ends etxending up through said holes in the bottom plate and communicating thereat respectively with said first plurality of passages in the top plate, and outer tubes secured to said bottom plate and extending downwardly therefrom, said outer tubes at their upper ends communicating respectively with said holes in the bottom plate, each of said outer tubes surrounding an inner tube and loosely receiving the same to define therewith a downwardly extending annular passage communicating with the respective hole in the bottom plate.

10. A multi-flavor filling nozzle for filling a plurality of rows, greater than two, of receptacles from two sources of differently flavored plastic comestible, comprising a top plate formed with a first plurality of passages presenting openings which extend in a row at the upper face of the top plate adjacent one end of the top plate, certain of said passages extending straight through the top plate and the others of said passages being in the form of channels extending along the upper face of the top plate and terminating in a series of holes through the top plate located inwardly from said one end of the top plate, said top plate being formed with a second plurality of passages presenting openings which extend in a row at the upper face of the top plate adjacent the opposite end of the top plate, certain of said second plurality of passages extending straight through the top plate and the others of said second plurality of passages being in the form of channels extending along the upper face of the top plate and terminating in a series of holes through the top plate located inwardly from said opposite end of the top plate, a middle plate separably mounted directly beneath the top plate and formed with a first set of passages which communicate respectively with said first plurality of passages in the top plate and a second set of passages which communicate respectively with said second plurality of passages in the top plate, a plurality of downwardly extending inner tubes separably positioned beneath said middle plate and arranged in a plurality of rows, greater than two, located inwardly from the ends of the plate assembly, said inner tubes at their upper ends communicating respectively with said first set of passages in the middle plate to receive the comestible discharged into said first plurality of passages in the top plate, a bottom plate separably positioned directly beneath said middle plate and formed with a plurality of channels extending along the upper face of the bottom plate and communicating with said second set of passages in the middle plate, said channels in the bottom plate terminating in a plurality of rows, greater than two, of holes extending through the bottom plate and through which said inner tubes extend freely, and outer tubes secured to said bottom plate and extending downwardly therefrom, said outer tubes at their upper ends communicating respectively with said holes in the bottom plate, each of said outer tubes surrounding an inner tube and loosely receiving the same to define therewith a downwardly extending annular passage communicating with the respective hole in the bottom plate.

RALPH F. ANDERSON.

References Cited in the file of this patent
UNITED STATES PATENTS

| Number | Name | Date |
|---|---|---|
| 2,067,750 | Bagby | Jan. 12, 1937 |
| 2,147,686 | Bagby | Feb. 21, 1939 |